(12) United States Patent
Sarkar et al.

(10) Patent No.: US 8,913,729 B2
(45) Date of Patent: Dec. 16, 2014

(54) AUTOMATED PROVISIONING

(75) Inventors: Ashis Sarkar, Tampa, FL (US);
Abhitabh Kushwaha, Tampa, FL (US);
Pardha S. Vishnumolakala, Tampa, FL (US)

(73) Assignee: Verizon Patent and Licensing Inc., Basking Ridge, NJ (US)

(*) Notice: Subject to any disclaimer, the term of this patent is extended or adjusted under 35 U.S.C. 154(b) by 1252 days.

(21) Appl. No.: 12/608,461

(22) Filed: Oct. 29, 2009

(65) Prior Publication Data
US 2011/0103566 A1 May 5, 2011

(51) Int. Cl.
*H04M 11/04* (2006.01)
*H04M 3/42* (2006.01)
*H04L 12/24* (2006.01)

(52) U.S. Cl.
CPC ............ *H04L 41/32* (2013.01); *H04L 41/0806* (2013.01); *H04L 41/5054* (2013.01)
USPC ............... 379/201.12; 379/27.01; 379/207.02

(58) Field of Classification Search
USPC ................. 379/27.01, 201.02, 201.12, 207.02
See application file for complete search history.

(56) References Cited

U.S. PATENT DOCUMENTS

| 5,687,224 | A  | * | 11/1997 | Alley et al. ............... 379/201.12 |
| 6,891,937 | B1 | * | 5/2005  | Kuhn et al. ............... 379/112.01 |
| 7,551,917 | B1 | * | 6/2009  | Winner et al. ............ 379/29.05 |
| 8,195,528 | B1 | * | 6/2012  | McLellan et al. ......... 705/26.81 |
| 2008/0080389 | A1 | * | 4/2008  | Hart et al. ..................... 370/252 |
| 2008/0243902 | A1 | * | 10/2008 | Rong et al. .................... 707/102 |
| 2009/0070162 | A1 | * | 3/2009  | Leonelli et al. .................. 705/7 |

* cited by examiner

*Primary Examiner* — Nafiz E Hoque (57) ABSTRACT

A system may include a memory configured to store a number of workflows and a system interface configured to communicate with other systems associated with provisioning a broadband service. The system may also include logic configured to receive input from a user identifying a first one of the workflows, where the first workflow includes actions associated with provisioning the broadband service and an output of at least some of the actions are linked to other actions associated with provisioning the broadband service. The logic is also configured to execute the first workflow, where when executing the first workflow, the logic is configured to transmit and receive information to and from the other systems via the system interface.

16 Claims, 8 Drawing Sheets

| ACTION NAME | STATUS | START DATE | FINISH DATE |
|---|---|---|---|
| VERIFICATION | SUCCESS | THU MAY 28 12:41:25 GMT 2009 | THU MAY 28 12:41:50 GMT 2009 |
| AUTO ASSIGNMENT | SUCCESS | THU MAY 28 12:41:52 GMT 2009 | THU MAY 28 12:41:58 GMT 2009 |
| PORT STATUS CHECK | SUCCESS | THU MAY 28 12:41:58 GMT 2009 | THU MAY 28 12:43:27 GMT 2009 |
| ACTIVATION | FAILED | THU MAY 28 12:43:27 GMT 2009 | THU MAY 28 12:43:59 GMT 2009 |
| ACTIVATION | SUCCESS | THU MAY 28 12:43:59 GMT 2009 | THU MAY 28 12:44:22 GMT 2009 |
| ACTIVATION | SUCCESS | THU MAY 28 12:44:22 GMT 2009 | THU MAY 28 12:44:30 GMT 2009 |
| DISCOVERY | SUCCESS | THU MAY 28 12:44:32 GMT 2009 | THU MAY 28 12:45:52 GMT 2009 |
| ENGINEERING REVIEW | SKIPPED | THU MAY 28 12:45:52 GMT 2009 | THU MAY 28 12:45:53 GMT 2009 |
| DISPATCH | SUCCESS | THU MAY 28 12:45:57 GMT 2009 | THU MAY 28 12:45:58 GMT 2009 |
| ORDER COMPLETION | SUCCESS | THU MAY 28 12:45:58 GMT 2009 | THU MAY 28 12:46:00 GMT 2009 |

AUTOMATED PROVISIONING

BACKGROUND INFORMATION

Providing various services to customers, such as telecommunications services, often requires a significant amount of manual processing. For example, a customer order is often taken by a service representative of the telecommunications service provider. The service representative may then enter data associated with the customer order into an order system. A network engineer may then access the order system and attempt to manually provision resources to fulfill the order.

One drawback with conventional order provisioning is that the time and resources expended often make it difficult to quickly process the order. For example, the time from taking the order to provisioning the service may take weeks or longer and may require significant human interaction. In situations where the service provider has hundreds or thousands of customers, such delays can result in canceled orders and loss of revenue with respect to providing the desired service.

DETAILED DESCRIPTION OF PREFERRED EMBODIMENTS

The following detailed description refers to the accompanying drawings. The same reference numbers in different drawings may identify the same or similar elements. Also, the following detailed description does not limit the invention.

Implementations described herein relate to an automated provisioning system that allows a service provider to automate many of the tasks needed to fulfill a customer's order. For example, in one implementation, the provisioning system may automate the processing and provisioning associated with an order for a broadband service. In such an implementation, the automated provisioning system may process the order by interfacing with other systems used to implement the order, thereby reducing the manual workload associated with fulfilling the order. In addition, the automated provisioning system may allow parties associated with the service provider to monitor the status of the order and potentially identify any problems associated with fulfilling the order in an expedited manner.

Figure 1:
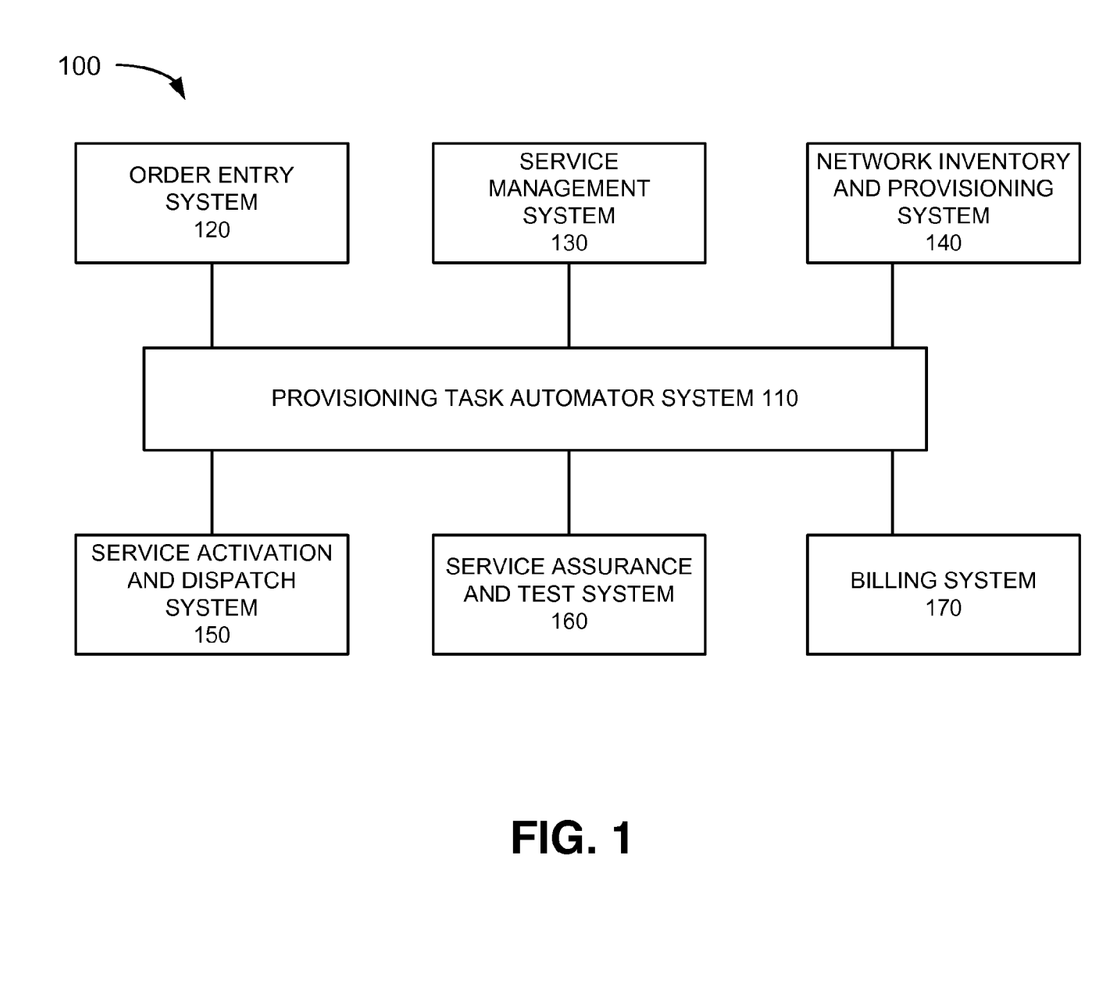
FIG. 1 illustrates an exemplary network in which systems and methods described herein may be implemented.

FIG. 1 illustrates an exemplary configuration of a network 100 in which methods and systems described herein may be implemented. Referring to FIG. 1, network 100 may include provisioning task automator system 110 (also referred to herein as provisioning task automator 110), order entry system 120, service management system 130, network inventory and provisioning system 140, service activation and dispatch system 150, service assurance and test system 160 and billing system 170. It will be appreciated that network 100 may include other components (not shown) that aid in automating a provisioning process.

Provisioning task automator system 110 acts as the backbone for the systems in network 100 and automates tasks associated with provisioning a service, such as a broadband service. In an exemplary implementation, provisioning task automator 110 provides the infrastructure for interfacing with a number of systems, such as systems 120-170. Provisioning task automator 110 may connect with systems 120-170 via wired, wireless or optical mechanisms. For example, in one implementation, provisioning task automator 110 may connected to systems 120-170 via a network, such as a local area network (LAN), a wide area network (WAN), an intranet, the Internet, a public switched telephone network (PSTN), or some combination of networks. In other instances, provisioning task automator 110 may connect to one or more of systems 120-170 via a directed wired connection. In each case, provisioning task automator 110 interacts with systems 120-170 to allow parties, such as customer service engineers or other parties associated with a service provider, to manage, configure, and provision services very efficiently.

Order entry system 120 may allow a party to enter a customer order regarding a service. For example, in one implementation, order entry system 120 may allow a customer to order a broadband service, such as a high-speed, high capacity circuit between the customer's remote offices, a virtual private network (VPN), etc. In one implementation, order entry system 120 may include a front end that is accessible via a network, such as the Internet, that allows a customer to easily enter initial order information. For example, order entry system 120 may include a graphical user interface (GUI) that facilitates entry of order information.

Service management system 130 may allow a party to verify information associated with an order. For example, service management system 130 or personnel associated with service management system 130 may verify that a pre-provisioned circuit will be able to meet the customer's requirements. Service management system 130 may also determine whether a customer order may require any special circuits/devices.

Network inventory and provisioning system 140 may store information regarding network resources/inventory that may be used to fulfill an order. For example, network inventory and provisioning system 140 may store information regarding switches, gateways, routers, etc., available to a service provider to implement a customer order. In one implementation, network inventory and provisioning system 140 and/or personnel associated with network inventory and provisioning system 140 may identify various switches, routers, gateways, etc., to provision or fulfill a customer order, such as a customer order for a new circuit.

Service activation and dispatch system 150 may dispatch work orders to field engineers or other customer representatives to initialize and/or troubleshoot a customer installation. For example, service activation and dispatch system 150 may include a trouble ticket system that identifies problems with an installation and dispatches trouble tickets identifying a party to fix the problem. Service activation and dispatch system 150 may also activate a particular new service, such as a new customer circuit.

Service assurance and test system 160 may periodically test customer circuits to ensure that the circuits meet agreed upon parameters, such as service level agreement (SLA) parameters. Service assurance and test system 160 may also determine whether ports and/or other circuit components provisioned for a new circuit are ready to be activated. Service and test system 160 may communicate results of such tests to provisioning task automator system 110.

Billing system 170 may track customer usage and generate invoices associated with customer usage. Billing system 170 may also communicate results of such tracking to provisioning task automator system 110.

The exemplary configuration illustrated in FIG. 1 is provided for simplicity. It should be understood that a typical network may include more or fewer devices than illustrated in FIG. 1. For example, network 100 may include additional elements, such as switches, gateways, routers, backend systems, etc., that aid in routing information between systems 110-170. In addition, although systems 110-170 are shown as separate devices in FIG. 1, in other implementations, the functions performed by two or more of these system may be performed by a single system or platform. In addition, the functions described as being performed by one system may be performed by another system in other implementations. Still further, network elements associated with fulfilling a customer order, such as network switches, routers, gateways, etc., are not shown in FIG. 1 for simplicity.

Figure 2:
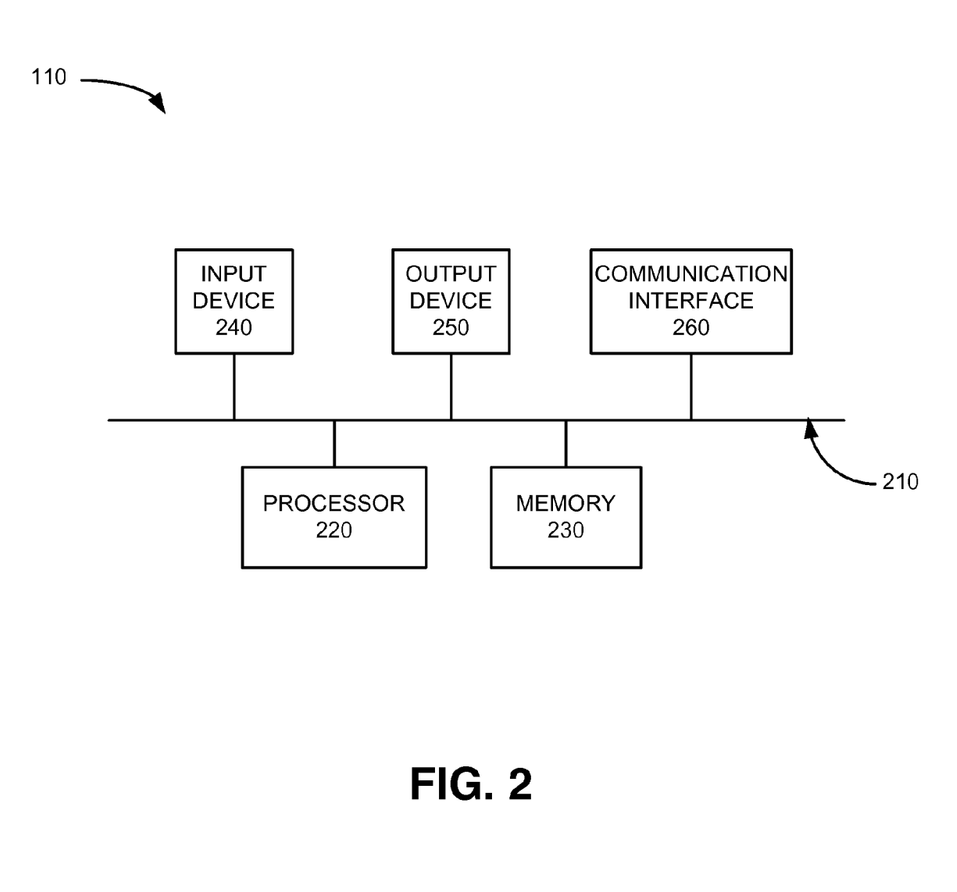
FIG. 2 illustrates an exemplary configuration of one or more of the systems of FIG. 1.

FIG. 2 illustrates an exemplary configuration of provisioning task automator system 110. One or more of systems 120-170 may be configured in a similar manner. Referring to FIG. 2, provisioning task automator system 110 may include a bus 210, a processor 220, a memory 230, an input device 240, an output device 250 and a communication interface 260. Bus 210 may include a path that permits communication among the elements of provisioning task automator system 110.

Processor 220 may include one or more processors, microprocessors, or processing logic that may interpret and execute instructions. Memory 230 may include a random access memory (RAM) or another type of dynamic storage device that may store information and instructions for execution by processor 220. Memory 230 may also include a read only memory (ROM) device or another type of static storage device that may store static information and instructions for use by processor 220. Memory 230 may further include a solid state drive (SDD). Memory 230 may also include a magnetic and/or optical recording medium (e.g., a hard disk) and its corresponding drive.

Input device 240 may include a mechanism that permits a user to input information to provisioning task automator system 110, such as a keyboard, a keypad, a mouse, a pen, a microphone, a touch screen, voice recognition and/or biometric mechanisms, etc. Output device 250 may include a mechanism that outputs information to the user, including a display, a printer, a speaker, etc.

Communication interface 260 may include any transceiver-like mechanism that provisioning task automator system 110 may use to communicate with other devices and/or systems (e.g., systems 120-170). For example, communication interface 260 may include mechanisms for communicating with systems 120-170 via wired, wireless or optical mechanisms. Communication interface 260 may also include a modem or an Ethernet interface to a LAN or other mechanisms for communicating via a network, such as a LAN, WAN, an intranet, the Internet, the PSTN, etc.

The exemplary configuration illustrated in FIG. 2 is provided for simplicity. It should be understood that provisioning task automator system 110 (and/or systems 120-170) may include more or fewer devices than illustrated in FIG. 2.

Provisioning task automator system 110 may perform processing associated with interacting with systems 120-170 to automate provisioning of services, such as broadband services. For example, provisioning task automator system 110 may perform processing associated with provisioning a new circuit, a virtual private network (VPN), an upgraded circuit, etc. Provisioning task automator system 110 may perform these operations in response to processor 220 executing sequences of instructions contained in a computer-readable medium, such as memory 230. A computer-readable medium may be defined as a physical or logical memory device. The software instructions may be read into memory 230 from another computer-readable medium (e.g., a hard disk drive (HDD), SSD, etc.), or from another device via communication interface 260. Alternatively, hard-wired circuitry may be used in place of or in combination with software instructions to implement processes consistent with the implementations described herein. Thus, implementations described herein are not limited to any specific combination of hardware circuitry and software.

Figure 3:
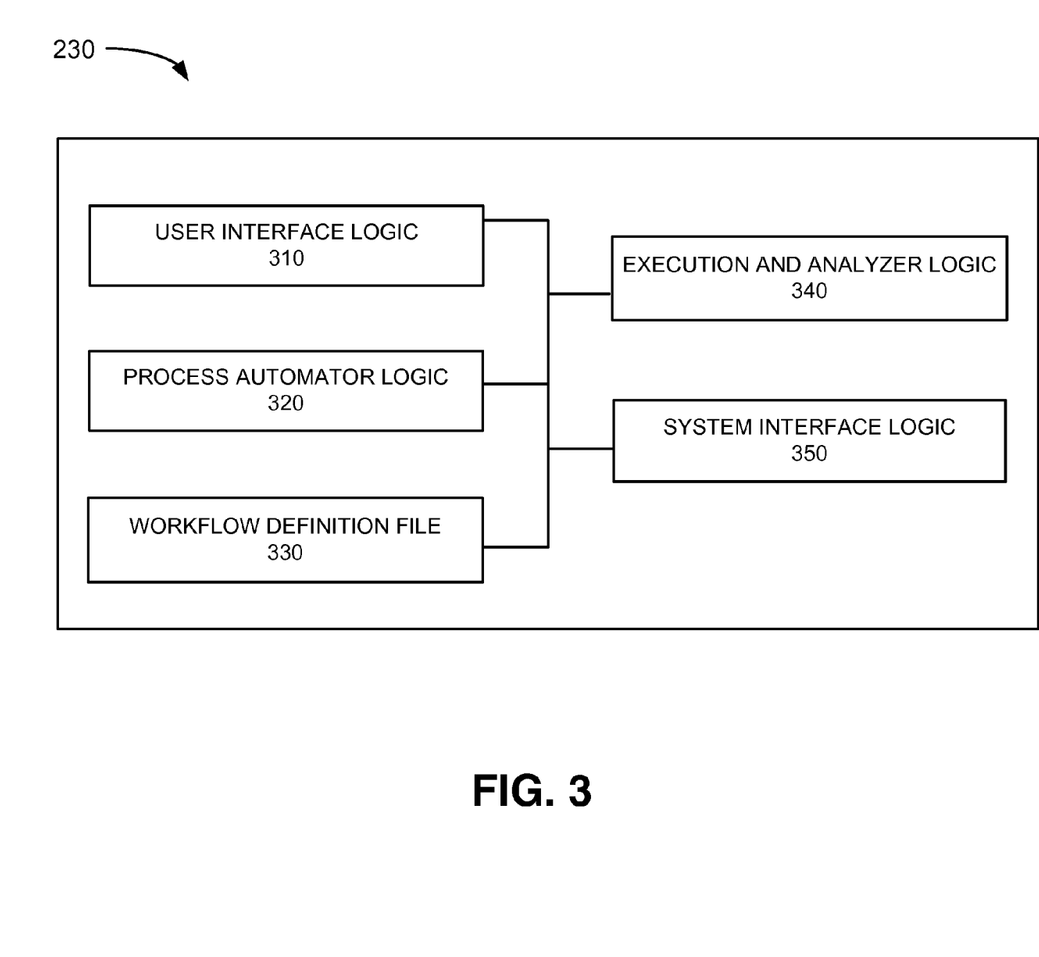
FIG. 3 illustrates an exemplary configuration of logic components implemented in the provisioning task automator system of FIG. 1.

FIG. 3 is an exemplary functional block diagram of components implemented in provisioning task automator system 110 of FIG. 2. In an exemplary implementation, all or some of the components illustrated in FIG. 3 may be stored in memory 230. For example, all or some of the components illustrated in FIG. 3 may be implemented by processor 220 executing one or more programs stored in memory 230.

Referring to FIG. 3, memory 230 may include user interface logic 310, process automator logic 320, workflow definition file 330, execution and analyzer logic 340 and system interface logic 350. The logic components are shown in FIG. 3 as being included in provisioning task automator system 110. In alternative implementations, these components or a portion of these components may be located externally with respect to provisioning task automator system 110.

User interface logic 310 may include logic to provide a party associated with a service provider with an interface to enter information associated with generating a workflow, executing a workflow and/or monitoring a workflow. The term "workflow" as used herein should be construed to mean any sequence of actions or tasks associated with provisioning a service and/or fulfilling a customer order. In an exemplary implementation, user interface logic 310 may provide a GUI that allows a user to easily enter information to generate, execute and/or monitor workflows associated with a customer order.

Process automator logic 320 may include logic that automates manual and repetitive procedures performed in a particular space, such as a broadband provisioning space. For example, process automator logic 320 may allow a user to generate complex modular units, referred to herein as actions or tasks, associated with provisioning a new customer service. In an exemplary implementation, an action may perform a discrete task, such as validate a customer order, perform port validation, design a customer circuit, send a dispatch message, etc. A user may generate instructions for performing an action, via user interface logic 310, and queue a number of actions in a particular sequence for execution by process automator logic 320.

For example, a workflow may include a number of user-configurable actions or tasks in a particular sequence. When process automator logic 320 executes a workflow, data may be queued using a messaging format, such as Java-based messaging. The queued data may be executed from one action to the next action until the desired result is achieved. In such instances, a user may not need to write code or instructions that define state transitions from one task action to another task action. In some instances, the user-configurable actions may include a scheduled date and time information associated with executing an action. For example, an action associated with activating a customer circuit or deactivating a customer service may include a particular date and time. In such instances, process automator logic 320 may not execute the action until the appropriate time. Using process automator logic 320, users can configure a workflow and store the workflow as, for example, an extensible markup language (XML) based configuration file. It should be understood that process automator logic 320 may configure workflows using other languages and/or formats.

Workflow definition file 330 may store workflows. For example, as discussed above, workflow definition file 330 may store XML based configuration files generated via process automator logic 320. As described above, it should be understood that other types of languages and/or formats may be used for the workflow definition files stored in workflow definition file 330.

Execution and analyzer logic 340 may execute workflows stored in workflow definition file 330. For example, a user may select, via user interface logic 310, a particular workflow to execute. In such a situation, execution and analyzer logic 340 may execute the selected workflow. Execution and analyzer logic 340 may also interact with other systems, such as work distribution systems (e.g., one or more of systems 120-170) to facilitate the provisioning of a service. For example, execution and analyzer logic 340 may interface with service activation and dispatch system 150 to execute a predefined action for a ticket creation (e.g., a work ticket to send a technician or engineer to a customer site). Such ticket creation may be the result of executing an action in a workflow or via a defined sequence for manual intervention. In either case, execution and analyzer logic 340 may interface with other systems (e.g., one or more of systems 120-170) to execute a workflow.

Execution and analyzer logic 340 may also analyze the execution of workflow, identify any potential errors or problems and/or perform system error handling. For example, in situations where an action generates an unforeseen error, execution and analyzer logic 340 may handle the error and notify the appropriate system/group of the problem, as described in more detail below. Execution and analyzer logic 340 may further include logic to manage transactions and system performance. For example, execution and analyzer logic 340 may execute a predefined sequence to ensure that complete execution is achieved with data consistency. Execution and analyzer logic 340 may also include logic to identify bottlenecks during workflow execution. Such bottlenecks may be analyzed and represented in, for example, Gantt chart format showing planned activities verses actual execution, as described in more detail below.

System interface logic 350 may include logic that enables provisioning task automator 110 to interface with other systems, such as one or more of systems 120-170. For example, system interface logic 350 may include software connection mechanisms and/or hardware connection mechanisms that enable provisioning task automator 110 to send and receive messages to systems 120-170 that are associated with fulfilling a customer order, as described in more detail below.

As discussed above, provisioning task automator system 110 may allow a service provider to automate much of the processing needed to fulfill a customer order. This enables customer orders to be filled in a very efficient manner, as described in detail below.

Figure 4:
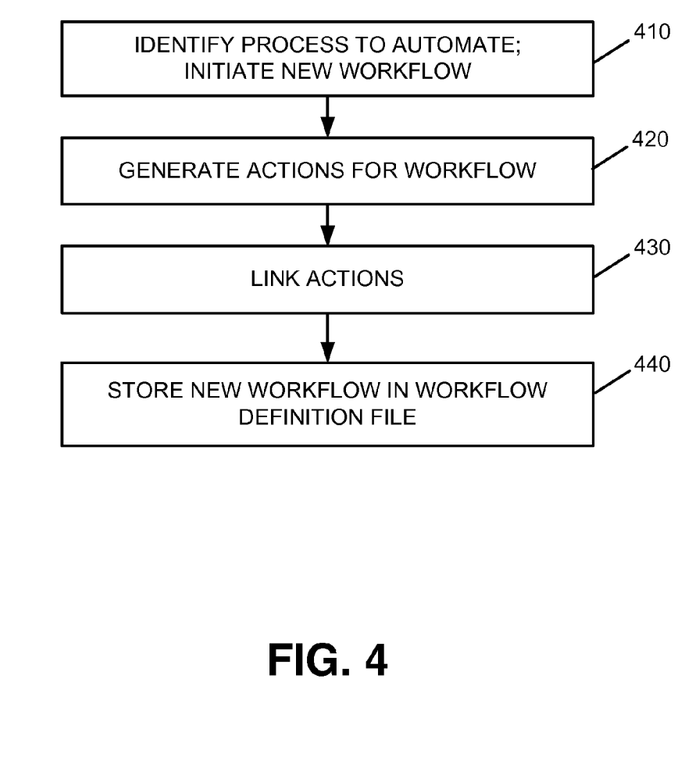
FIG. 4 is a flow diagram illustrating exemplary processing by various devices illustrated in FIG. 1.

FIG. 4 is a flow diagram illustrating exemplary processing associated with a user interacting with provisioning task automator 110 to generate a workflow. As described above, a workflow may include a sequence of user-configured actionable events or tasks that are defined for a particular service (e.g., provisioning a broadband service). Therefore, the processing described with respect to FIG. 4 may be performed prior to receiving or processing an order from a customer.

Processing may begin with the user interacting with user interface logic 310 to generate a workflow associated with automating a repetitive task that requires a significant amount of human interaction (act 410). In this example, assume that the user would like to generate a workflow associated with provisioning a new high speed circuit, such as an optical carrier level three (OC-3) circuit, an OC-12 circuit, etc., for use between two customer locations. In this case, the user may initiate a new workflow via user interface logic 310 (act 410). For example, the user may select a "generate new workflow" icon provided via a GUI associated with user interface logic 310.

As described above, a workflow may include a number of actions in a sequence. In this example, one of the actions may be associated with gathering information associated with an order and validating the order, such as the customer order for the new circuit in this example. In this case, a user may create an order validation action (act 420). For example, the user may input instructions via user interface logic 310 indicating that process automator logic 320 is to interface with order entry system 120 to validate the customer order. In one exemplary implementation, the user may indicate that process automator logic 320 is to communicate with order entry system 120 via system interface logic 350 to extract and/or verify that adequate information associated with the order has been stored in order entry system 120. For example, the user may program process automator logic 320 to extract and/or verify that origination and destination locations for the new circuit have been provided, a transmission speed for the new circuit has been provided, billing information associated with the customer/new circuit has been provided, etc.

The user may also define another action associated with the customer order assignment (act 420). For example, the user may input instructions via user interface logic 310 indicating that process automator logic 320 is to interface with network inventory and provisioning system 140 via system interface logic 350 to identify and/or assign network resources to fulfill the order. For example, in one implementation, the user may provide instructions for process automator logic 320 to forward information associated with the validated customer order to network inventory and provisioning system 140. Network inventory and provisioning system 140 may then assign network resources (e.g., switches, routers, gateways) to fulfill the order. In other implementations, the user may provide instructions for process automator logic 320 to assign network resources to fulfill the customer order and forward the information to network inventory and provisioning system 140. In some implementations, network resources associated with fulfilling the order may involve assigning equipment that crosses state or country boundaries and includes diverse and/or heterogeneous equipment or circuit segments that may in some instances, span different service providers. In each case, process automator logic 320 may be configured to interact with network inventory and provisioning system 140 to assign the network resources needed to fulfill the customer order.

The user may define a further action associated with performing an engineering verification associated with the provisioned circuit resources (act 420). For example, the user may input instructions via user interface logic 310 indicating that process automator logic 320 is to interface with service management system 130 via system interface logic 350 to determine whether the provisioned network resources associated with the customer circuit provides a viable circuit. For example, process automator logic 320 may forward information associated with the pre-provisioned circuit to service management system 130. Service management system 130 and/or engineering personnel associated with service management system 130 may then verify that the pre-provisioned circuit will be able to meet the customer's requirements.

In this example associated with provisioning a new circuit, the user may also define a task associated with port validation (act 420). For example, the user may input instructions via user interface logic 310 indicating that process automator logic 320 is to interface with service assurance and test system 160 via system interface logic 350 to determine whether the ports and/or other circuit components located in the new circuit are ready to be activated. For example, process automator logic 320 may forward information associated with the engineering-approved circuit to service assurance and test system 160 to determine whether the ports associated with the circuit are ready for activation. Service assurance and test system 160 and/or engineering personnel associated with service assurance and test system 160 may then verify that the ports on various network devices associated with the circuit are ready for activation.

In an exemplary implementation, service assurance and test system 160 may periodically validate port status information for routers, gateways, switches, etc. In such a scenario, process automator logic 320 may extract the information regarding the ports of interest. In other scenarios, service assurance and test system 160 may perform a port status check in response to a communication or query from process automator logic 320 regarding the ports of interest. In either case, the appropriate port statuses may be checked and the status of the ports communicated to process automator logic 320.

Another action associated with the workflow may involve dispatching service personnel to various network equipment associated with activating the circuit. For example, in some scenarios, the new customer circuit may not be able to be activated remotely from a control center environment. In such scenarios, the user may input instructions via user interface logic 310 indicating that process automator logic 320 is to interface with service activation and dispatch system 150 via system interface logic 350 to dispatch the appropriate personnel to the locations to activate the circuit. For example, process automator logic 320 may forward information associated with the engineering-approved circuit to service activation and dispatch system 150 to indicate that engineering personnel needed to activate the circuit are to be dispatched to the appropriate locations.

Still another action associated with the workflow may involve billing a customer. For example, in some scenarios, the user may input instructions via user interface logic 310 indicating that process automator logic 320 is to interface with billing system 170 to bill the customer for providing the new circuit and/or for use of the new circuit. For example, process automator logic 320 may forward information associated with the activated circuit to billing system 170 to indicate that billing system 170 is to bill the customer for setting up the circuit.

After the user has defined the actions associated with the workflow, the user may link or queue the actions into a logical workflow (act 430). For example, the user may indicate that process automator logic 320 is to link the success/failure output of the order validation action to the order assignment action, and that the output of the order assignment action is to be linked to the input of the engineering validation action. The user may also indicate that the output of the engineering validation action is to be input to the port validation action and that the output of the port validation action is to be input to the dispatch action. In this manner, the tasks may be linked/queued in a logical workflow that ensures that each action is complete before the next action is initiated.

As discussed above, some user actions may include schedule information. For example, an action associated with activating a customer circuit or deactivating a customer service may include a particular date and time. In such instances, process automator logic 320 may not execute the action until the appropriate time. Therefore, initiating some actions may be time-dependent, as well as dependent on successful completion of a previous action.

After a workflow is completed, the user may store the workflow in workflow definition file 330 (act 440). The workflow may then be used in the future each time a new circuit is being provisioned. In this manner, repetitive tasks requiring significant human interaction may be simplified and automated using provisioning task automator system 110, as described in more detail below.

Figure 5:
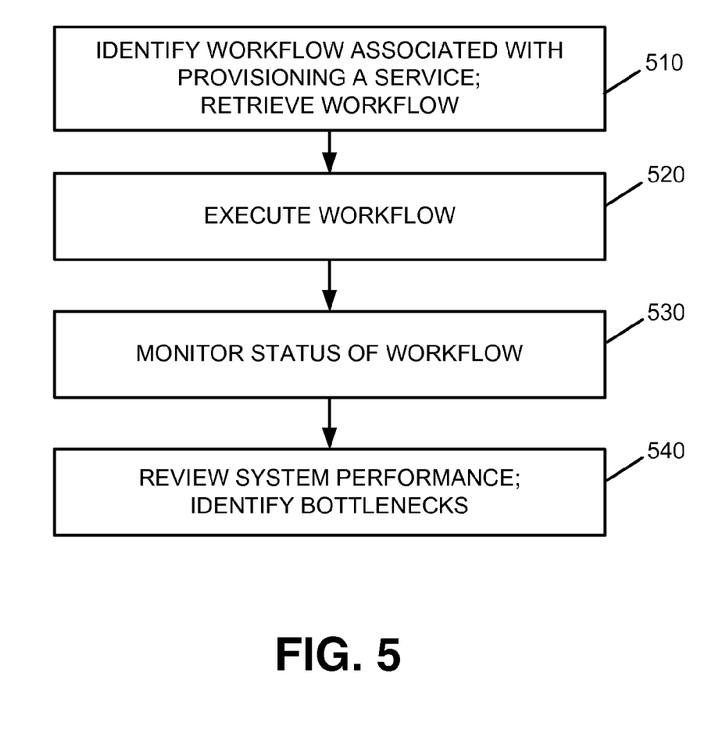
FIG. 5 is a flow diagram illustrating exemplary processing associated with executing a workflow stored in the provisioning task automator system of FIG. 3.

FIG. 5 illustrates exemplary processing associated with executing a workflow. In this example, assume that a customer has decided to order a new broadband service, such as order a new high speed OC-12 circuit connecting one of the customer's office in Tampa, Fla. to another one of the customer's offices in Washington, D.C. In this example, a user may access provisioning task automator 110, identify an appropriate workflow stored in workflow definition file 330 and retrieve the identified workflow (act 510). For example, a user may access user interface logic 310 and select a workflow associated with provisioning a new circuit. In an exemplary implementation, the workflows may be stored in workflow definition file 330 with titles that make it very easy for a user to recall the appropriate workflow.

Execution and analyzer logic 340 may then execute the selected workflow (act 520). In the exemplary workflow discussed above with respect to FIG. 4, execution and analyzer logic 340 may instruct process automator logic 320 to execute the linked tasks as described above. For example, assume that the first action in the workflow is the action associated with validating the order. In this case, process automator logic 320 may interface with order entry system 120 to validate the customer order. For example, as discussed above, process automator logic 320 may verify that origination and destination locations for the new circuit have been provided, a transmission speed for the new circuit has been provided, billing information associated with the new circuit has been provided, etc.

Assuming that process automator logic 320 successfully validates the order, process automator logic 320 may interface with network inventory and provisioning system 140 to assign network resources (e.g., switches, routers, gateways) to fulfill the order. As discussed above, in some implementations, process automator logic 320 may forward information associated with the validated order to network inventory and provisioning system 140, which assigns network resources to fulfill the customer order and forwards the information back to provisioning task automator system 110. In other instances, process automator logic 320 may assign network resources to fulfill the order and forward the assigned resources to network inventory and provisioning system 140.

In either case, assume that the order assignment/provisioning action is successfully completed, action is successful, process automator logic 320 may interface with service management system 130 to perform an engineering validation action to determine whether the provisioned circuit is viable. For example, process automator logic 320 may forward information associated with the pre-provisioned circuit to service management system 130, which may then verify that the pre-provisioned circuit will be able to meet the customer's requirements.

Assuming that the engineering validation action is successful, process automator logic 320 may interface with service assurance and test system 160 to perform a port status validation action to determine whether the ports and/or other circuit components located in the new circuit are ready to be activated. For example, process automator logic 320 may forward information associated with the engineering-approved circuit to service assurance and test system 160 to determine whether the ports associated with the circuit are ready for activation.

Assuming that the port status validation action is successful, process automator logic 320 may interface with service activation and dispatch system 150 to activate the circuit and/or send a work ticket associated with the order to the appropriate personnel to activate the circuit. If the service activation action is successful, the new circuit may be activated.

In the manner described above, process automator logic 320 may automate the provisioning of the circuit and eliminate most or all of the manual processing associated with provisioning the circuit. That is, tasks associated with a party manually interacting with a number of diverse systems that may be involved in provisioning the service may be eliminated via provisioning task automator system 110.

In addition, if a failure occurs when executing an action, process automator logic 320 may automatically handle the error. For example, if an error occurs during the order assignment and network inventory and provisioning system 140 is unable to assign valid resources to fulfill the customer order, process automator logic 320 may automatically trigger a notice or alert to network inventory and provisioning system 140 that will alert personnel to the problem. In one implementation, process automator logic 320 may also signal a trouble ticket system associated with network inventory and provisioning system 140 to open a trouble ticket to address the problem. In such an instance, personnel associated with network inventory and provisioning system 140 may manually provision the resources to fulfill the order.

As provisioning task automator system 110 is processing the workflow, a party associated with fulfilling the new order (e.g., a customer engineer) may want to determine the status or monitor the status of the workflow as the workflow is executing (act 530). For example, using user interface logic 310, a party may select a "monitor status" button (or similar button) or select the workflow of interest that is being executed. The GUI associated with user interface logic 310 may present the user with a graphical representation of the workflow status. For example, in one implementation, the GUI may provide workflow status 600 illustrated in FIG. 6.

Figure 6:
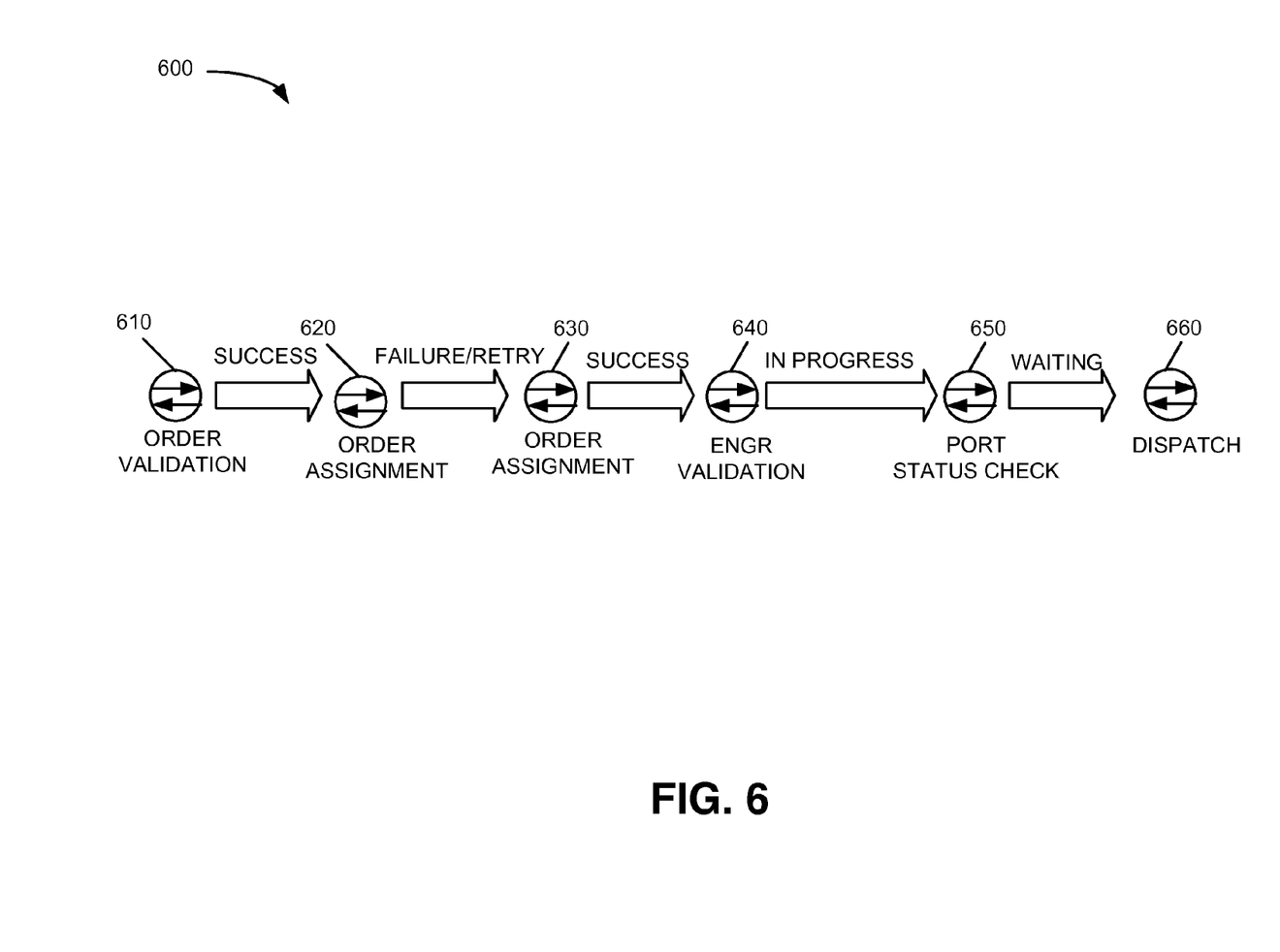
FIG. 6 illustrates an exemplary graphical representation of a workflow.

Referring to FIG. 6, workflow status 600 may be output by provisioning task automator system 110 for viewing by a user via, for example, output device 250 (FIG. 2). As illustrated, workflow status 600 may include circles 610-660 representing actions in the workflow. For example, circle 610 may represent an order validation action, circles 620 and 630 may represent an order assignment action, circle 640 may represent an engineering validation action, circle 650 may represent a port status action and circle 660 may represent a dispatch action.

As illustrated in FIG. 6, the status of each action may be represented by text indicators, such as success, failure, retry, in progress, waiting. It should be understood that other indicators may be used. In addition, in some implementations, workflow status 600 may be augmented using colors that enable a user to easily determine the success/failure of any action. For example, a failure may be highlighted in red, while a success may be highlighted in green. In this manner, a user may graphically monitor the status of a particular workflow. For example, referring to FIG. 6, a user may quickly identify that the order assignment action initially failed, that provisioning task automator 110 retried the action and the action was successful on the second attempt. Also, the workflow status 600 indicates that the engineering validation task is in progress and that the port status check is waiting to occur. In some implementations, workflow status 600 may be refreshed or updated in real time or near real time.

Still further, workflow status 600 allows the user to quickly identify whether any tasks not illustrated in FIG. 6 are needed to implement the workflow. For example, if the engineering validation task was missing from workflow status 600, a customer engineer may determine that the workflow needs to be modified to include such an action. In this case, the user may interact with user interface logic 310 to modify the existing workflow associated with provisioning a new circuit to include this action.

As provisioning task automator system 110 is processing the workflow, or after a workflow has been executed, a party associated with fulfilling the new order (e.g., a customer engineer) may wish to identify various system performance parameters associated with the workflow (act 540). For example, using user interface logic 310, a user may select a "system performance" button (or similar button) associated with a workflow being executed or previously executed. The GUI associated with user interface logic 310 may present the user with an output, for example, in Gantt chart format or some other format, that illustrates planned activities versus actual execution. For example, in one implementation, the GUI may output workflow performance chart 700 illustrated in FIG. 7.

Figure 7:
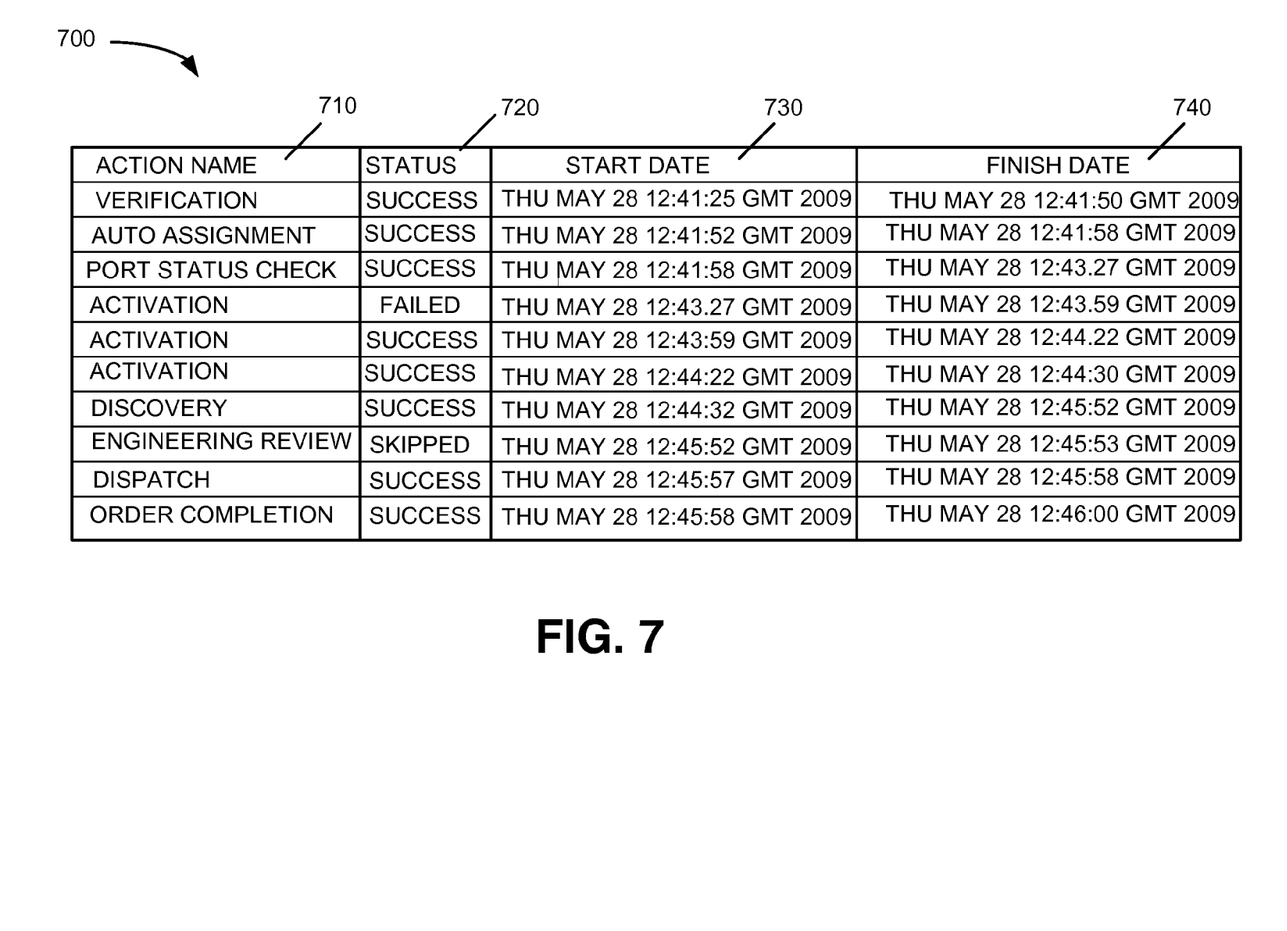
FIG. 7 illustrates an exemplary output associated with an executed workflow.

Referring to FIG. 7, workflow performance chart 700 may be output by provisioning task automator system 110 for viewing by a user via, for example, output device 250 (FIG. 2). As illustrated, workflow performance chart 700 may include an action name field 710, a status field 720, a start date field 730 and finish date field 740. It should be understood that other fields may be included in workflow performance chart 700, such as a user comments field that allows a user to enter remarks regarding the actions. As illustrated in FIG. 7, status field 720 may identify whether the action identified in field 710 was successfully performed, skipped, failed, etc. In addition, fields 730 and 740 may indicate a start date and time and a finish date and time for each action. In this manner, a party responsible for monitoring a workflow may be able to identify bottlenecks in a workflow (act 540). As an example, in FIG. 7, a party responsible with monitoring workflow 700 may identify that one of the activations task originally failed, was retried and was successful. This may indicate a problem associated with that task. Workflow performance chart 700 may also indicate that engineering review action 710 was skipped. This may also indicate a problem with that action. Start date and finish date fields 730 and 740 may also be used to determine whether a particular action took too much time to complete. In this manner, a party responsible for monitoring workflows may be able to identify problems (e.g., bottlenecks, actions more likely to fail, etc.). This may allow a party to go back and modify a workflow so that such errors are less likely to occur in the future.

Although the workflow described above proceeds in a sequential manner in which one action must complete (e.g., either success or failure) before another action is to proceed, in other instances, some of the tasks may be executed in a parallel manner or a combination of sequential and parallel manners. That is, depending on the workflow, process automator logic 320 may execute some of the actions at substantially the same time. For example, an action for validating an order may occur substantially simultaneously with an action for entering order information into a billing system (e.g., billing system 170). In each case, by allowing dynamic or static workflow sequences to be created and also allowing a user to create rollback tasks (e.g., signal a system/party for manual intervention when an error occurs), provisioning task automator system 110 provides a user with a system that simplifies order processing and provisioning. Such a system may be particularly useful in provisioning services that require interaction with diverse systems.

Figure 8:
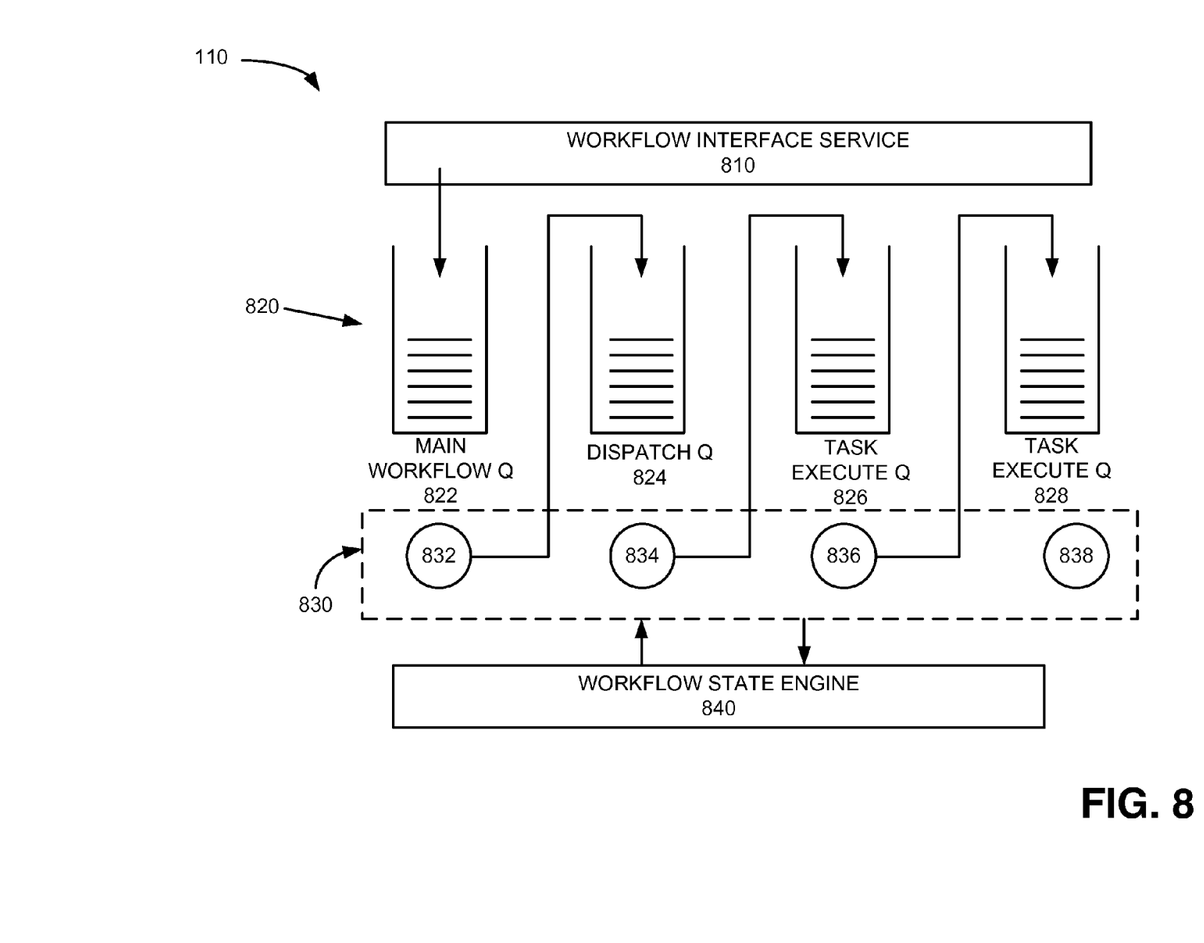
FIG. 8 illustrates the execution of a workflow by the provisioning task automator of FIG. 1 in accordance with an exemplary implementation.

As described above, provisioning task automator 110 may be used to execute a workflow that includes a number of actionable events associated with provisioning a service (e.g., provisioning a broadband service). Although not described in detail above, some workflows may include a large number of tasks (e.g., hundreds of tasks) and provisioning task automator 110 may execute a number of workflows simultaneously. In such cases, provisioning task automator 110 may queue various tasks or events. For example, FIG. 8 illustrates the execution of a workflow by the provisioning task automator 110 of FIG. 1 in accordance with an exemplary implementation. Referring to FIG. 8, provisioning task automator 110 may include workflow interface service 810, queues 820, task executers 830 and workflow state engine 840. In an exemplary implementation, all or some of the components illustrated in FIG. 8 may be stored in memory 230. For example, all or some of the components illustrated in FIG. 8 may be implemented by processor 220 executing one or more programs stored in memory 230.

Workflow interface service 810 may receive workflows stored in workflow definition file 330 (not shown in FIG. 8). Queues 820 may include a main workflow queue 822, a dispatch queue 824 and task execute queues 826 and 828. Queues 822-828 may store tasks or events for execution, as described in more detail below. In addition, although four queues are illustrated in FIG. 8, it should be understood that more or less queues may be used.

Task executers 830 includes task executers 832, 834, 836 and 838, represented by circles in FIG. 8. Task executers 832-838 operator to execute or schedule tasks or events for execution based on the type of event. In addition, although four task executers are illustrated in FIG. 8, it should be understood that more or less task executers may be used. Workflow state engine 840 interfaces with task executers 832-838 to maintain the operating state of workflows being executed.

Referring to FIG. 8, workflow interface service 810 may receive a workflow from workflow definition file 330 (not shown) and forward the workflow to main workflow queue 822, as illustrated by the arrow in FIG. 8. Task executer 832 may analyze the workflow and based on, for example, the particular service associated with the workflow, forward the workflow to dispatch queue 824. Task executer 834 may similarly analyze the tasks queued in dispatch queue 824 and forward at least some of the queued tasks to task execute queue 826. For example, task executer 834 may analyze tasks in dispatch queue 824 and queue up similar tasks or events into the same queue. For example, task executer 834 may forward or queue up all assignment tasks into a task execution queue, such as task execute queue 826, that may be designed to handle assignment tasks or events. In addition, task executer 834 may queue tasks or events based on whether the tasks are time dependent (e.g., must be executed in a particular order or at a particular time).

Task executer 836 may then execute the tasks in task execute queue 826. Task executor 836 may also forward some of the tasks to task execute queue 828, as illustrated by the arrow in FIG. 8. For example, task executer 836 may forward tasks to be performed after the tasks stored in task execute queue 826. In this manner, task executers 830 (e.g., task executers 832-838) may execute tasks stored in queues 822-828 in an efficient manner.

As described briefly above, workflow state engine 840 may store state information associated with the state of execution of a workflow while the workflow is executing. In this manner, workflow state engine 840 may enable provisioning task automator 110 to provide a party associated with executing or monitoring the workflow (e.g., a network engineer) with a status of the workflow, such as workflow status 600 (FIG. 6).

As described above, workflow interface service 810 may forward workflows to main workflow queue 822 for execution. In some implementations, main workflow queue 822 may include a number of different workflows associated with provisioning different services. In such implementations, task executers 832-838 may simultaneously execute tasks associated with the different workflows. In each case, the individual workflows will each be executed as described above to provision the service associated with the particular workflow.

Implementations described herein automate much of the manual processing associated with customer orders. This may allow a service provider to provision a new service and/or change an existing service in a very efficient manner with little human involvement. In addition, parties associated with a service provider may monitor a workflow in real time or near real time as the workflow is executing. This may allow a service provider to quickly identify problems.

The foregoing description of exemplary implementations provides illustration and description, but is not intended to be exhaustive or to limit the embodiments to the precise form disclosed. Modifications and variations are possible in light of the above teachings or may be acquired from practice of the embodiments.

For example, in the implementations described above, provisioning task automator system 110 was described mainly with respect to provisioning a broadband service. In other implementations, other types of services may be provisioned in a similar manner. In each case, the provisioning task automator system 110 may interface with a number of systems to automate the provisioning process.

In addition, while series of acts have been described with respect to FIGS. 4 and 5, the order of the acts may be varied in other implementations. Moreover, non-dependent acts may be implemented in parallel.

It will be apparent that various features described above may be implemented in many different forms of software, firmware, and hardware in the implementations illustrated in the figures. The actual software code or specialized control hardware used to implement the various features is not limiting. Thus, the operation and behavior of the features were described without reference to the specific software code—it being understood that one of ordinary skill in the art would be able to design software and control hardware to implement the various features based on the description herein.

Further, certain portions of the invention may be implemented as "logic" that performs one or more functions. This logic may include hardware, such as one or more processors, microprocessors, application specific integrated circuits, field programmable gate arrays or other processing logic, software, or a combination of hardware and software.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

No element, act, or instruction used in the description of the present application should be construed as critical or essential to the invention unless explicitly described as such. Also, as used herein, the article "a" is intended to include one or more items. Further, the phrase "based on" is intended to mean "based, at least in part, on" unless explicitly stated otherwise.

What is claimed is:

1. A system, comprising:
    a memory configured to store a plurality of workflows;
    a system interface configured to communicate with a plurality of other systems associated with provisioning a broadband service; and
    logic configured to:
        receive input from a user identifying a first one of the plurality of workflows, the first workflow including a plurality of actions associated with provisioning the broadband service, wherein an output of at least some of the plurality of actions are linked to other ones of the plurality of actions associated with provisioning the broadband service,
        execute the first workflow, wherein when executing the first workflow, the logic is configured to transmit and receive information to and from the plurality of other systems via the system interface,
    wherein the plurality of actions comprise validating a customer order and performing a port status check, wherein when validating the customer order, the logic is configured to:
        verify that an origination location and a destination location for a new circuit have been provided, and
        verify that transmission speed information associated with the new circuit has been provided,
    wherein when performing a port status check, the logic is configured to:
        determine whether ports associated with one or more devices in the new circuit are ready to be activated, and
    wherein the logic is further configured to:
        interface with a network inventory system to provision network resources for the new circuit,
        access a second workflow stored in the memory in response to a user request, and
        modify the second workflow based on performance parameters associated with execution of the second workflow.

2. The system of claim 1, wherein the plurality of actions further comprise assigning network resources to fulfill the customer order.

3. The system of claim 2, wherein the plurality of actions further comprise a dispatch-related action or an activation-related action.

4. The system of claim 1, wherein when executing the first workflow, the logic is configured to communicate with an order entry system, a network provisioning system and an activation system.

5. The system of claim 1, wherein the logic is further configured to:
    receive a request, from a user, regarding a status of the first workflow, and
    output a graphical representation of the first workflow, while the first workflow is executing, in response to the user request.

6. The system of claim 1, wherein the logic is further configured to:
    receive a request, from a user, regarding performance of the first workflow, and
    output information identifying performance parameters associated with the first workflow in response to the user request.

7. The system of claim 6, wherein the performance parameters include start and end times associated with executing at least some of the plurality of actions in the first workflow.

8. The system of claim 1, wherein at least a first one of the actions includes time information and when executing the first workflow, the logic is configured to:
    execute the first action in accordance with the time information.

9. A method, comprising:
    receiving, by a provisioning system comprising at least one processor, input from a user identifying a first one of a plurality of workflows, the first workflow including a plurality of actions associated with provisioning a service, wherein an output of at least some of the plurality of actions are linked to other ones of the plurality of actions associated with provisioning the service;
    executing, by the provisioning system, the first workflow, wherein executing the first workflow includes:
        transmitting information to a plurality of other systems associated with provisioning the service, and
        receiving information from the plurality of other systems,
    wherein the plurality of actions comprise:
        validating a customer order associated with provisioning the service,
        assigning, after the customer order is validated and via interaction with a network inventory system, resources associated with fulfilling the customer order,
        determining whether the assigned resources will be able to meet requirements associated with the customer order,
        determining, in response to determining that the assigned resources will be able to meet the requirements associated with fulfilling the customer order, whether components associated with fulfilling the customer order are ready to be activated, and
        activating the service or sending a notification to personnel to activate the service, in response to determining that components associated with fulfilling the customer order are ready to be activated,
    wherein the provisioning a service comprises activating a circuit,
    wherein validating a customer order comprises:
        verifying that an origination location and a destination location for the circuit have been provided, and
        verifying that a transmission speed for the circuit has been provided, and wherein the determining whether components associated with fulfilling the customer order are ready to be activated comprises:
performing a port status check to determine whether ports associated with the circuit are ready for activation;
receiving a request regarding performance of the first workflow; and
outputting information identifying performance parameters associated with the first workflow in response to the request.

10. The method of claim 9, wherein executing the first workflow comprises:
communicating with an order entry system, a network provisioning system and an activation system.

11. The method of claim 9, further comprising:
receiving a request regarding a status of the first workflow; and
outputting a graphical representation of the first workflow, while the first workflow is executing, in response to the request.

12. The method of claim 9, wherein the outputting information comprises outputting start and end times associated with at least some of the plurality of actions in the first workflow in a chart format.

13. The method of claim 9, wherein the activating the service is time dependent, and wherein executing the first workflow comprises:
activating the service in accordance with time information indicating a date and time to activate the service.

14. A non-transitory computer-readable medium having stored thereon sequences of instructions which, when executed by at least one processor, cause the at least one processor to:
receive input from a user identifying a first one of a plurality of provisioning-related files, the first file including a plurality of actions associated with provisioning a service;
execute the first file, wherein executing the first file includes:
transmitting information to a plurality of systems associated with provisioning the service, and
receiving information from the plurality of systems indicating a success or failure of the actions,
wherein the plurality of actions comprise:
validating a customer order associated with provisioning the service,
assigning resources associated with fulfilling the customer order, and
determining whether the assigned resources will be able to meet requirements associated with the customer order,
wherein the provisioning a service comprises activating a circuit,
wherein when validating a customer order, the instructions cause the at least one processor to:
verify that an origination location and a destination location for the circuit have been provided, and
verify that a transmission speed for the circuit has been provided,
wherein when determining whether the assigned resources will be able to meet requirements associated with the customer order, the instructions cause the at least one processor to:
perform a port status check to determine whether ports associated with the circuit are ready for activation;
receive a request regarding performance associated with execution of the first file; and
output information identifying performance parameters associated with execution of the first file in response to the request.

15. The non-transitory computer-readable medium of claim 14, wherein when transmitting information to the plurality of systems, the instructions cause the at least one processor to:
communicate with a customer order system to validate the customer order, and
communicate with a network provisioning system to assign network resources to fulfill the customer order.

16. The non-transitory computer-readable medium of claim 15, further including instructions for causing the at least one processor to:
provide a user interface for output to a display device, the user interface including an item to allow the user to determine a status of execution of the first file; and
output a graphical representation illustrating the status of executing of the first file, while the first file is executing.

* * * * *